United States Patent Office 2,860,445
Patented Nov. 18, 1958

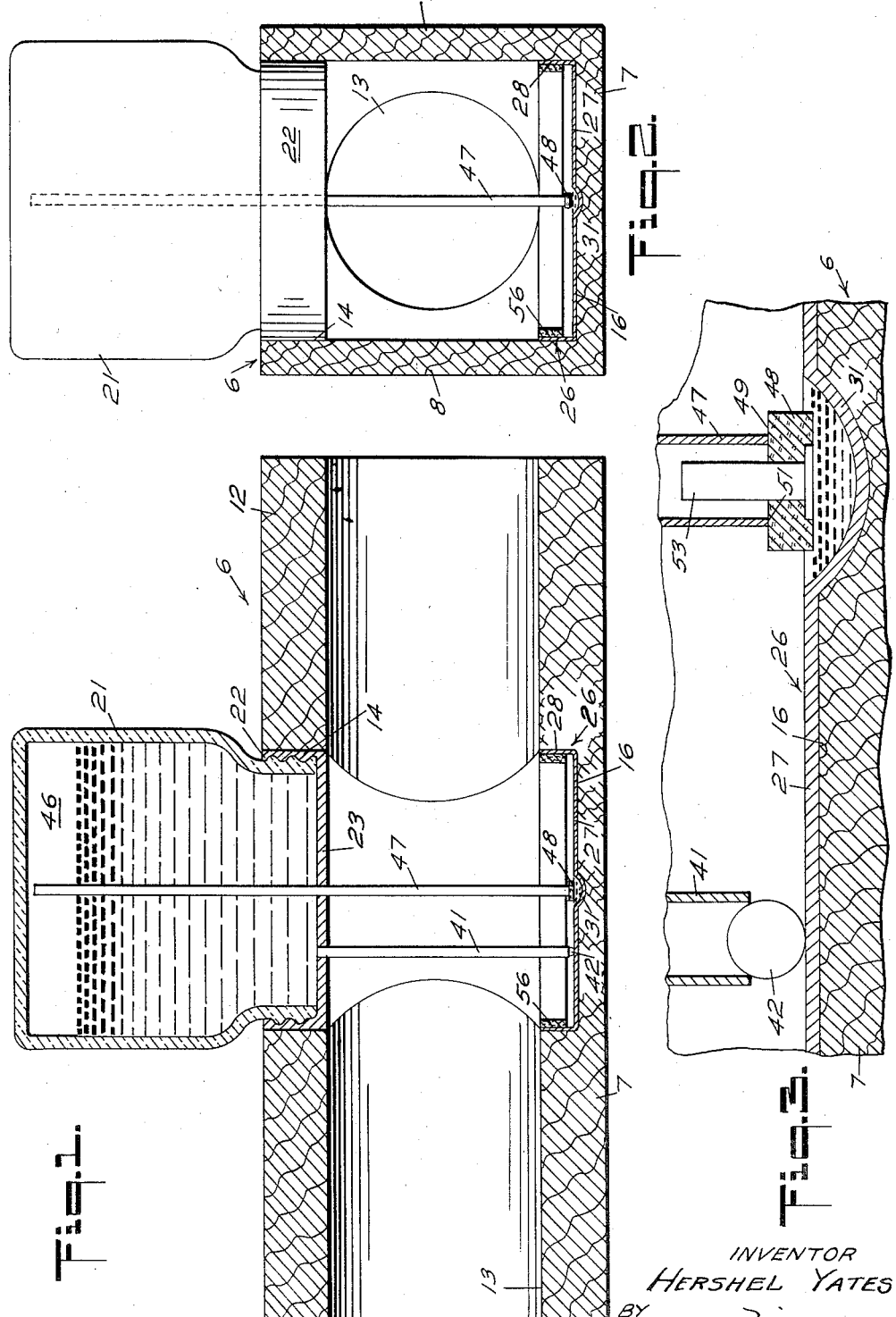

2,860,445

RODENT EXTERMINATING DEVICE

Hershel Yates, Vacaville, Calif.

Application November 4, 1955, Serial No. 544,925

9 Claims. (Cl. 43—131)

This invention relates to apparatus for the killing of rodents and the like, and is more specifically directed towards a rodent exterminator in which all moving parts found in conventional traps or exterminators have been eliminated.

In most conventional devices of the above character, there are provided various mechanical arrangements for trapping and/or killing a rodent. Due to such mechanical arrangements, the parts will, in many instances, become worn and inoperative; and in many such devices, even when in first class condition, it is necessary to reset the same after each rodent has been trapped or killed.

Accordingly, it is an object of the present invention to provide a rodent exterminating device in which all moving parts have been eliminated, and which may be effectively operated over extremely long periods of time without any required servicing or maintenance.

Another object of my invention is to provide a rodent exterminator of the character described in which a small quantity of poisonous liquid is provided, which is adapted to be contacted by the rodent, and in which means are provided for positively maintaining such a liquid quantity over extended time intervals, whereby the exterminator may be utilized over such extended period without servicing.

A further object of the invention is to provide apparatus of the character described including novel means for automatically dispensing liquid to a predetermined depth.

Yet another object of the invention is to provide apparatus of the type described which may be handled by children without danger of contamination by the poison.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a longitudinal sectional view of the apparatus of the present invention.

Figure 2 is a transverse sectional view.

Figure 3 is an enlarged view of portions of the apparatus disclosed in Figure 1.

In broad terms, the exterminator of the present invention is designed so as to permit a rodent to travel therethrough, with a poisonous liquid contained in the path of travel for attracting the rodents and subsequently killing the same upon contact therewith. It will, of course, be understood that the invention is not directed towards the poison per se as there are numerous rodent exterminating chemicals readily available on the market; but the present invention is directed solely towards the means for containing such liquid and for properly dispensing the same in a novel form of device.

With reference to the drawing, it will be noted that the device may be simply and economically formed by providing a block-like member 6, preferably of rectangular form, so as to provide a bottom 7, sides 8 and 9, and a top 12. By way of example, the block could be formed of wood with the length of the unit being approximately 10 inches long and the cross-sectional size of the block being approximately 4 inches square. Extending longitudinally through the block is a circular bore 13 of approximately 2½ inches diameter so as to permit ready entry into the bore of a rodent, but which is sufficiently small to prevent cats, dogs or other household pets from entering the same. Extending downwardly and transversely of bore 13 is a vertically extending bore 14 whose lower end terminates as indicated at 16 in the lower portion of the block and subjacent the lowermost portion of bore 13. The purpose of this bore will be presently explained.

Extending upwardly from the bore 14 is a container 21 adapted to contain a supply of liquid poison, and a threaded cover 22 for the container may be inverted and cemented within the upper portion of bore 14 whereby the container or jar in its normal position of use will be inverted and maintained in position by the threaded engagement with the cover, but conversely, may be unscrewed for refilling or the like. Preferably the top 23 of the cover is disposed generally tangential to the bore 13 whereby the effective cross-sectional area of such bore is not interfered with. Within the recess formed by the portion of bore 14 below bore 13 there is provided a cup-like member 26 having a bottom wall 27 seated on the termination 16 of the bore and an annular vertically extending side wall 28 which terminates tangentially to the lower edge of bore 13. The member 26 is further provided with a well portion 31 which may be formed as a depression in the central portion of the member. This well portion, as will be presently explained, is adapted to contain a quantity of the liquid from container 21 whereby a rodent passing through the bore 13 will either eat some of the same or contact the liquid with one of his feet and subsequently result in the extermination of the rodent. There are numerous types of liquid poisons which by odor or taste are attractive to rodents, and it is this type of poison that would naturally be used in the container and in the well.

As an important feature of the present invention, means are provided interconnecting well 31 with the interior of container 21 for insuring an automatic replenishing of the well when filling is necessitated either by reason of a rodent removing such liquid, evaporation or the like. To accomplish the foregoing I provide a feed pipe 41 which extends from the cover 22 to a point slightly above the horizontal portion 27 of member 26. The preferable spacing between the end of pipe 41 and the upper surface of portion 27 is in the neighborhood of $\frac{1}{32}$ of an inch whereby a bubble of the liquid, illustrated by the numeral 42 in Figure 3 will be caused to engage the portion 27 before leaving the tube 41 thereby causing the bubble to break up before being disseminated onto the surface of the member 26.

Naturally, if the container is sealed, the mere use of a feed pipe extending from the interior of the container to a point adjacent the cup-shaped member 26 will not result in liquid flowing therethrough, and therefore a vent opening to the container is required. If the space 46 above the liquid in the container may be vented to the atmosphere, liquid will gravitally flow through the tube 41, and so long as the space 46 is vented all of the liquid could readily run out of the container. However, as was previously discussed, it is desired to maintain only a minimum amount of the poisonous liquid and confine such amount to the well 31. Accordingly, in connection with the vent means I provide an automatic shut-off for the vent upon the liquid level in the well reaching a predetermined height. As is best seen in the enlarged representation in Figure 3, a vent tube 47 is provided, such tube extending upwardly from well 31, passing through the container cover 22 up to the space 46 in the container 21. So long as the lower end of the tube is open to the atmosphere, liquid will flow from the container through pipe 41 into member 26. However, by closing the end of tube 47 such flow will be immediately halted. To provide for this sequential closing and opening of the vent tube, there is provided a float 48 formed of cork or the like which is adapted to float on the surface of the liquid in well 31. When the liquid level reaches a desired height, the upper portion 49 of the float will engage the lower end 51 of tube 47 and thereby seal the same from the atmosphere and prevent further withdrawal of liquid from the container. Conversely, when the liquid level in well 31 drops, the cork will likewise drop and provide a space between the cork portion 49 and tube end 51, venting the container to the atmosphere and permitting the addition of replenishing liquid. The liquid passing through pipe 41 may gravitally flow along member 26 into the well by making the latter of slightly sloping form and directed downwardly towards the well. Also, to insure alignment of the float with the tube 47 there may be provided a guide pin 53 which prevents transverse separation of the parts. Both the pipe 41 and vent tube 47 may be made of 1/8 inch copper tubing or the like and it will be appreciated that as all of the parts of the device are relatively standard, the device may be economically produced. It will also be noted that within the member 26 there is provided an absorbing annular ring 56 of felt or the like, such band being adapted to absorb any liquid in the well in the event the trap is accidently inverted.

From the foregoing description both the details of construction and mode of operation of the device of the instant invention should be readily appreciated, and it will be observed that not only is the construction simple, but no maintenance is required, for so long as any liquid remains in the container 21 it will be automatically metered to the well 31 which will remain at a substantially constant and predetermined depth for the exterminating purposes. Like, due to the construction of the device, there is no danger of any person or household pet accidentally contacting the liquid.

What is claimed is:
1. A device of the character described including a longitudinally extending member having an axial bore therethrough, a transverse bore in said member and terminating subjacent said longitudinal bore and defining a well, a container disposed in said transverse bore and positioned over said longitudinal bore, a feed pipe from said container extending along said transverse bore and terminating subjacent the longitudinal bore in said well, a vent pipe extending from said container to said well, and means for selectively opening and closing said vent tube.

2. A rodent exterminator comprising a member having a horizontally extending bore therethrough, a transverse vertical bore extending from the upper end of said member to a position below said horizontal bore to provide a recess, a poison-containing liquid container disposed within the upper end of said transverse bore, a feed pipe from said container to said recess, a vent pipe from said container to said recess, and a float adapted to selectively open and close said vent pipe within said recess and movable in accordance with the liquid level therein.

3. Apparatus as set forth in claim 2 including a liquid absorbing band extending circumferentially around and within said recess.

4. A device of the character described comprising a horizontally extending member having an axial horizontal bore therethrough, a vertical transverse bore extending from the upper end of said member through said horizontal bore and terminating in a recess subjacent said horizontal bore, a container extending upwardly from the vertical bore and including a vertical feed pipe communicating with the interior of said container and terminating adjacent said recess, a spaced vertical vent pipe communicating with the interior of said container and terminating adjacent said recess, means in said recess defining a well portion, a float disposed in said well portion and adapted to engage the lower end of said vent pipe upon liquid level in said well portion approaching the general plane of the top of said recess.

5. A device of the character described comprising a horizontally extending member having an axially extending bore therethrough, means defining a transverse recess having an upper surface below said bore, a liquid container disposed above said axial bore, a feed tube extending transversely of said axial bore and extending into said container and having a lower edge portion disposed adjacent the surface of said recess whereby liquid may flow from said container into said recess, a vent pipe extending transversely through said axial bore and having an open upper end portion disposed within said container and an open lower end portion disposed adjacent said recess, and float means in said recess and vertically movable to selectively open and close the lower end portion of said vent tube upon change of liquid level in said recess.

6. Apparatus as set forth in claim 5 including a well portion axially aligned with said vent tube and arranged to receive said float, and guide means extending vertically upwardly from said float and movable within said vent tube for limiting relative transverse movement between said float and tube.

7. Apparatus as set forth in claim 5 in which said container is provided with a readily removable cover portion through which said feed pipe and vent tube extend, said cover being insertible within a bore in axial alignment with said recess and disposed upwardly of said axial bore.

8. A rodent exterminator comprising a longitudinally extending member having an axial horizontal bore extending therethrough and being open at the ends thereof, means defining a transverse bore through an upper portion of said member in communication with said axial bore, a liquid insecticide container mounted in said transverse bore and positioned above said axial bore, a vertical vent pipe extending from said container transversely through said axial bore to adjacent the bottom of the latter, and a feed tube extending from said container transversely through said axial bore and terminating adjacent the bottom of said axial bore at a greater distance than said vent pipe, said axial bore being substantially unobstructed except for said vent pipe and feed tube.

9. Apparatus as set forth in claim 8 in which said member is provided with a recess in vertical alignment with said transverse bore, and said pipe and tube extend into said recess.

References Cited in the file of this patent

UNITED STATES PATENTS

| 442,857 | Cole | Dec. 16, 1890 |
| 965,392 | Meeker | July 26, 1910 |
| 1,117,431 | Olds | Nov. 17, 1914 |
| 1,302,160 | Hedrich et al. | Apr. 29, 1919 |
| 1,573,278 | Schlesinger | Feb. 16, 1926 |
| 2,372,544 | Borman et al. | May 21, 1943 |
| 2,618,237 | McDermott et al. | Nov. 18, 1952 |
| 2,623,500 | Riley et al. | Feb. 20, 1952 |
| 2,635,382 | Kuntz | Apr. 21, 1953 |
| 2,690,028 | Mullen | Sept. 28, 1954 |
| 2,733,848 | Houwers | Feb. 7, 1956 |

FOREIGN PATENTS

| 246,452 | Switzerland | Sept. 16, 1947 |
| 708,226 | Great Britain | Apr. 28, 1954 |